(12) United States Patent
Chen

(10) Patent No.: US 7,154,567 B2
(45) Date of Patent: Dec. 26, 2006

(54) PROJECTION LENS REGULATOR FOR REAR PROJECTION TELEVISION

(75) Inventor: Tien-Ching Chen, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 503 days.

(21) Appl. No.: 10/773,150

(22) Filed: Feb. 9, 2004

(65) Prior Publication Data

US 2005/0174496 A1   Aug. 11, 2005

(51) Int. Cl.
*H04N 5/74* (2006.01)
*G02B 7/02* (2006.01)

(52) U.S. Cl. ............... 348/781; 359/823; 359/827; 359/830

(58) Field of Classification Search .......... 348/781, 348/785, 756; 359/811, 819, 801, 804, 805, 359/808, 822, 829, 830, 827; 353/24, 100, 353/101; 352/198, 203
See application file for complete search history.

(56) References Cited

U.S. PATENT DOCUMENTS

| 4,281,895 A | * | 8/1981 | Mohr | 359/827 |
| 4,957,341 A | * | 9/1990 | Hasegawa | 359/819 |
| 5,054,886 A | * | 10/1991 | Ozaki et al. | 359/823 |
| 5,212,595 A | * | 5/1993 | Dennison et al. | 359/513 |
| 5,218,484 A | * | 6/1993 | Terai | 359/823 |
| 5,249,082 A | * | 9/1993 | Newman | 359/813 |
| 5,299,067 A | * | 3/1994 | Kutz et al. | 359/827 |
| 6,567,222 B1 | * | 5/2003 | Shirota | 359/699 |
| 6,594,089 B1 | * | 7/2003 | Tanabe et al. | 359/703 |
| 2003/0128304 A1 | * | 7/2003 | Park et al. | 348/781 |
| 2004/0125471 A1 | * | 7/2004 | Chen | 359/811 |
| 2004/0212904 A1 | * | 10/2004 | Sekine et al. | 359/819 |

\* cited by examiner

*Primary Examiner*—Victor R. Kostak
(74) *Attorney, Agent, or Firm*—Bacon & Thomas, PLLC

(57) ABSTRACT

A projection lens regulator for a projection television includes a base, a barrel and an immobilizing hoop. The base has an annular wall, a slope guide slot at the annular wall, and a resilient flexible sheet defined by a pair of incisions at an upper side of the annular wall. The barrel is fitted inside the annular wall of the base and has an annular wall and a slope guide rib at an outer surface of the annular wall of the barrel. The slope guide rib is movably received in the slope guide slot of the base. The immobilizing hoop has an annular wall fitted on the base, and an arched convexity, which is formed at an inner surface of the annular wall thereof, corresponding in position to the flexible sheet of the base.

4 Claims, 4 Drawing Sheets

PROJECTION LENS REGULATOR FOR REAR PROJECTION TELEVISION

BACKGROUND OF THE INVENTION

1. Field of the Invention

The present invention relates generally to a projection lens of a rear projection television (TV), and more particularly to an improved projection lens regulator for the rear projection TV.

2. Description of the Related Art

A conventional projection lens regulator for a rear projection TV, as shown in FIG. 1, is composed of a base 1' disposed with lenses (not shown) at its bottom side, a barrel 2' fitted inside the base 1', and a projection lens (not shown) mounted inside the barrel 2'. The projection lens regulator is operated to adjust the relative position between the lenses (not shown) and the barrel 2', thereby generating clear visual images on the TV. The base 1' includes two slope guide slots 11' positioned symmetrically at two opposite sides of an annular wall thereof. The barrel 2' includes two columns 21' protruded from an outer peripheral surface thereof and corresponding to the two slope guide slots 11' for running through the two slope guide slots 11'. Two butterfly-shaped nuts 12' are respectively threadedly mounted on the two columns 21'. While the regulator is operated to adjust the aforementioned relative position, the nuts 12' are screwed loosely and then the two columns 21' are moved respectively along the two slope guide slots 11' at the same time to drive the barrel 2' to move axially with respect to the base 1', such that the visual images can be adjustably formed. While the aforementioned relative position is rendered optimally, the nuts 12' are screwed tight to fasten the base 1' and the barrel 2' together.

While the aforementioned regulator is operated, the barrel not only moves axially with respect to the base but also rotates with respect to the base. In addition, while the aforementioned relative position is rendered optimally, the two butterfly nuts have to be screwed tight at the same time, such that the operation is complicated and subject to randomize the focal length of the projection lens so as to further reduce the quality of the visual images. Moreover, the slope guide slots are exposed outside to get dusty easily and to uglify the regulator in appearance.

SUMMARY OF THE INVENTION

The primary objective of the present invention is to provide an improved projection lens regulator, which is structurally simple and rapid to render a focal length and a fixed position of a projection lens.

The foregoing objective of the present invention is attained by the projection lens regulator, which is composed of a base, a barrel fitted inside the base, and an immobilizing hoop fitted around the base. The base has an annular wall, a slope guide slot at the annular wall, and a resilient flexible sheet defined by a pair of incisions at an upper side of the annular wall. The barrel has an annular wall and a slope guide rib at an outer surface of the annular wall thereof. The slope guide rib is movably received in the slope guide slot of the base. The immobilizing hoop has an annular wall fitted on the base, and an arched convexity, which is formed at an inner surface of the annular wall thereof, corresponding in position to the flexible sheet of the base.

Preferably, the base is provided with at least two of the resilient flexible sheets symmetrically angularly positioned thereon.

Preferably, the resilient flexible sheet is provided with a skidproof pad mounted on an inner side thereof.

Preferably, the base is provided with a plurality of arched grooves formed at an outer surface of the annular wall thereof, and the immobilizing hoop is provided with a plurality of arched ridges formed at an inner surface of the annular wall thereof to fit the arched grooves of the base.

DETAILED DESCRIPTION OF THE INVENTION

Figure 1:
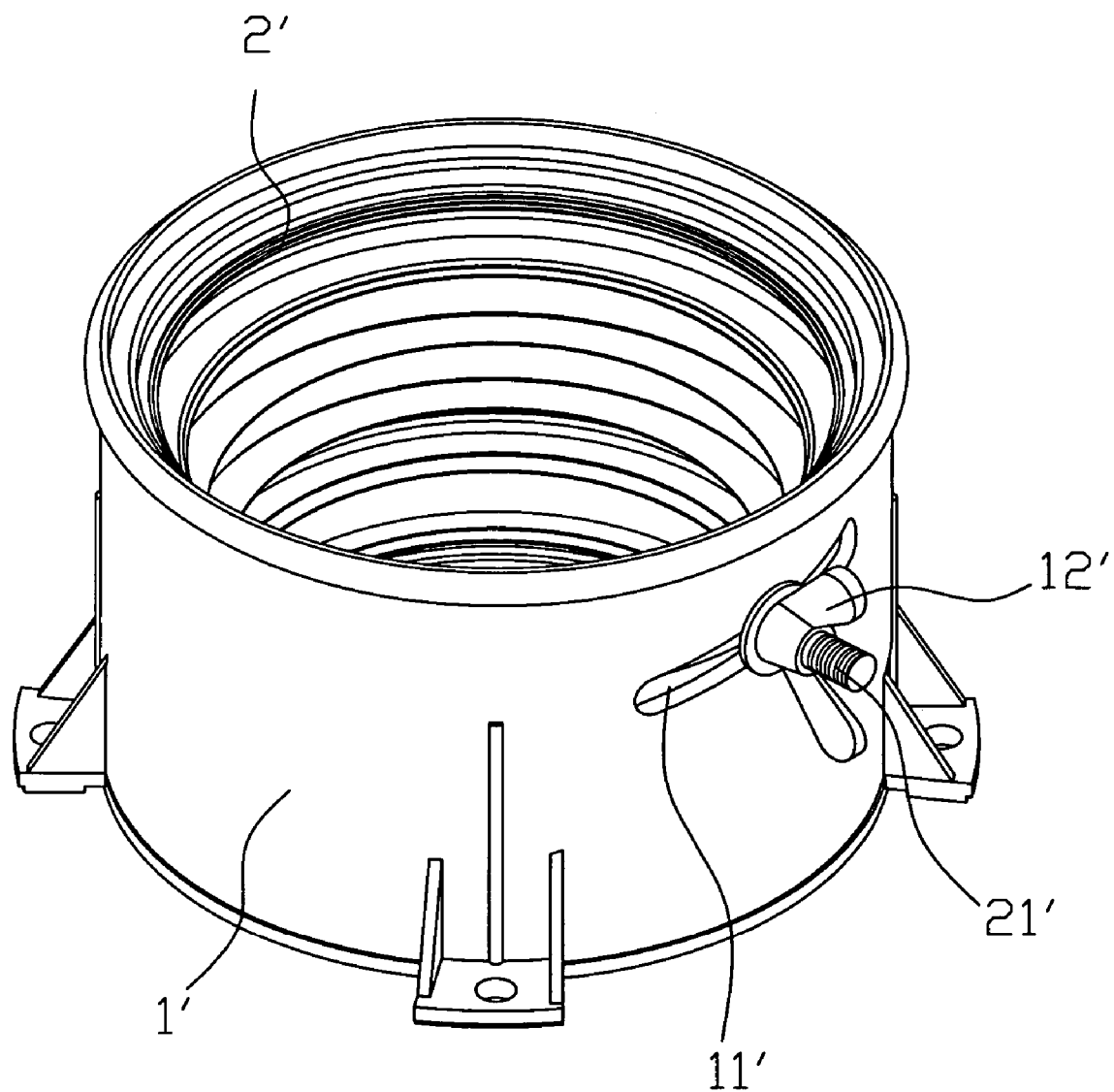
FIG. 1 is a perspective view of a prior art.
Figure 2:
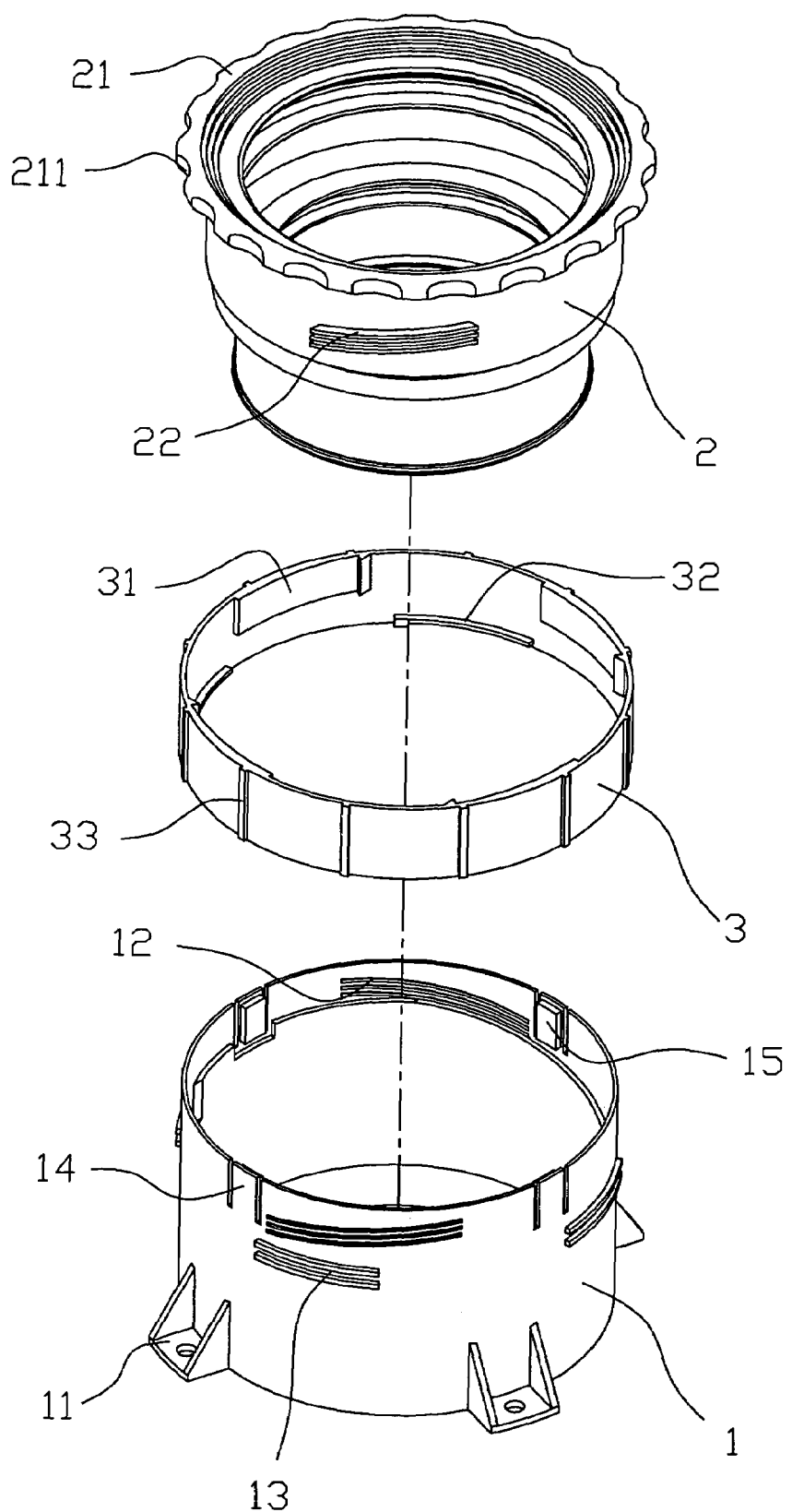
FIG. 2 is an exploded view of a preferred embodiment of the present invention.

Referring to FIG. 2, a projection lens regulator for a rear projection TV is composed of a base 1, a barrel 2, and an immobilizing hoop 3.

The base 1 is a bucket-shaped member, including four fixtures 11 mounted at a lower side of an outer surface of an annular wall thereof for being fixed on other accessory, slope guide slots 12 formed respectively at two opposite sides of the annular wall thereof, a plurality of arched grooves 13, each of which is defined by a pair of arched ribs on the outer surface of the annular wall, serially arranged at the outer surface of the annular wall thereof, and flexible sheets 14, which are embodied as four resilient flexible sheets 14 symmetrically angularly positioned at an upper side of the annular wall in this embodiment. Each of the flexible sheets 14 is defined by two incisions formed at the upper side of the annular wall of the base and fastened with a skidproof pad 15.

The barrel 2 is a bucket-shaped member and is fitted inside the base 1, including a projection lens set (not shown) stalled inside, a skirt portion 21 extending radially from an upper edge of an annular wall thereof, a plurality of concavities 211 evenly arranged on the skirt portion 21 to be conveniently held by the user's hand for easily turning the barrel 2 in adjustment, and slope guide ribs 22 formed respectively at two opposite sides of an outer surface of the annular wall thereof, corresponding in position and number to the slope guide slots 12 of the base 1.

Referring to FIG. 2, the immobilizing hoop 3 is an annular member, including four arched convexities 31 each of which is protruded radially from an inner surface of an annular wall with a various thickness in cross section thereof and is corresponsive in position to one of the flexible sheets 14 of the base 1, a plurality of arched ridges 32 formed at a lower side of the inner surface of the annular wall thereof, which correspond in position and number to the arched grooves 13 of the base 1 respectively, and skidproof ribs 33 formed at an outer surface of the annular wall thereof for enhancing friction.

Figure 3:
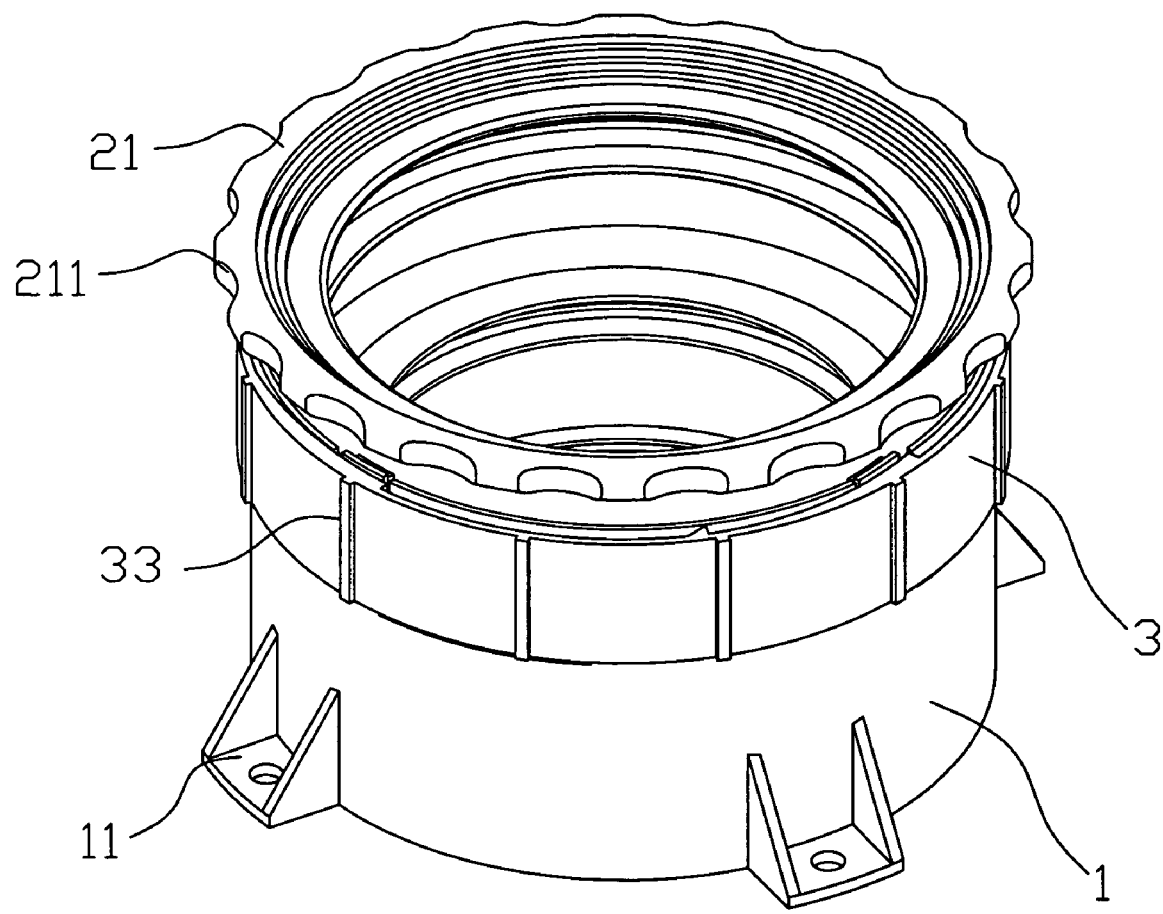
FIG. 3 is a perspective view of the preferred embodiment of the present invention.
Figure 4:
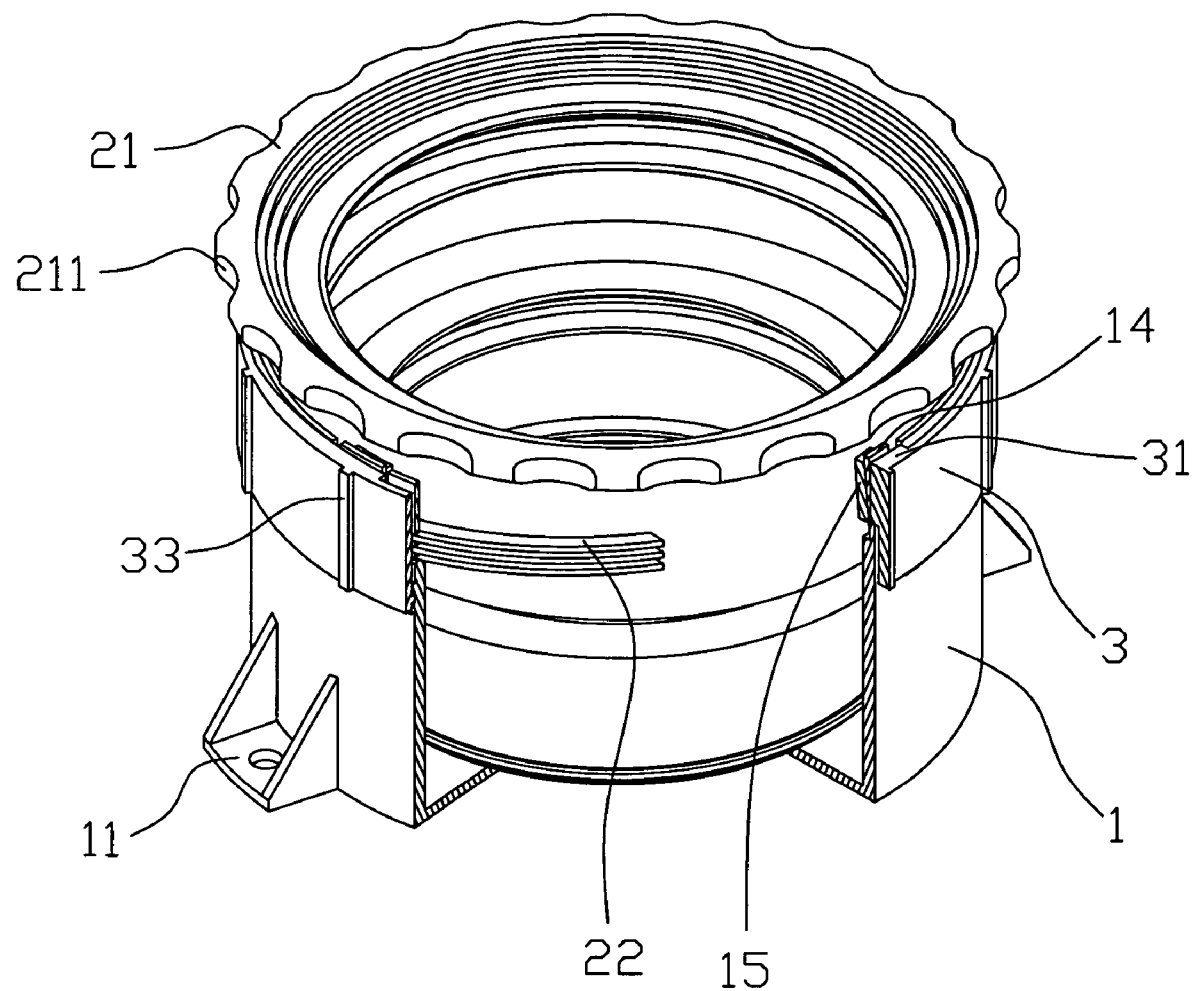
FIG. 4 is a schematic view of the preferred embodiment of the present invention in operation.

While the projection lens regulator of the present invention is assembled, as shown in FIGS. 3 and 4, the barrel 2 is fitted inside the base 1, the slope guide ribs 22 of the barrel 2 are fitted with the slope guide slots 12 of the base 1, and the slope guide ribs 22 are slidable along the slope guide slots 12 to enable the barrel 2 to move axially with respect to the base 1; the immobilizing hoop 3 is fitted around the base 1 to enable the arched ridges 32 to fit the arched grooves 13, thereby completing the assembly.

When the user intends to operate the projection lens regulator to make visual images clear, as shown in FIG. 4, the user can hold the skirt portion 21 of the barrel 2 and turn the barrel 2; in the meantime, the slope guide ribs 22 of the barrel 2 slidably move along the slope guide slots 12 of the base 1, and the barrel 2 moves axially with respect to the base 1. When the barrel 2 is moved to a desired position, the user can turn the immobilizing hoop 3 to enable the hoop 3 to rotate along the arched grooves 13 of the base 1, and meanwhile, the arched convexities 31 push against the flexible sheets 14 to enable the flexible sheets 14 to deform inwards, and then the skidproof pads 15 of the flexible sheets 14 oppress the barrel 2 to fix the projection lens in the desired position.

What is claimed is:

1. A projection lens regulator for a projection television, said projection lens regulator comprising:
   a base having an annular wall, a slope guide slot at the annular wall, and a resilient flexible sheet defined by a pair of incisions at an upper side of the annular wall;
   a barrel fitted inside the annular wall of said base and having an annular wall and a slope guide rib at an outer surface of said annular wall of the barrel, said slope guide rib being movably received in the slope guide slot of said base; and
   an immobilizing hoop having an annular wall fitted on said base, and an arched convexity, which is formed at an inner surface of said annular wall thereof, corresponding in position to the flexible sheet of said base.

2. The projection lens regulator as defined in claim 1, wherein said base comprises at least two of said flexible sheets, said flexible sheets being angularly symmetrically positioned; said immobilizing hoop comprises at least two of said arched convexities.

3. The projection lens regulator as defined in claim 2, wherein each of said flexible sheets is disposed with a skidproof pad on an inner side thereof.

4. The projection lens regulator as defined in claim 1, wherein said base further comprises an arched groove at an outer surface of said annular wall thereof; said immobilizing hoop further comprises an arched ridge to fit said arched groove.

* * * * *